US008151159B2

(12) United States Patent
Ike (10) Patent No.: US 8,151,159 B2
(45) Date of Patent: Apr. 3, 2012

(54) DATA COMMUNICATIONS SYSTEM AND DATA COMMUNICATIONS METHOD BETWEEN DISTRIBUTED CONTROLLERS CONNECTED BY SERIAL BUS

(75) Inventor: Katsuhisa Ike, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1036 days.

(21) Appl. No.: 12/024,247

(22) Filed: Feb. 1, 2008

(65) Prior Publication Data

US 2008/0189586 A1 Aug. 7, 2008

(30) Foreign Application Priority Data

Feb. 1, 2007 (JP) ................................. 2007-023463

(51) Int. Cl.
*H03M 13/00* (2006.01)
(52) U.S. Cl. .......................... 714/751; 714/774; 714/786
(58) Field of Classification Search .................. 714/748, 714/751
See application file for complete search history.

(56) References Cited

U.S. PATENT DOCUMENTS

| | | | | |
|---|---|---|---|---|
| 6,917,967 B2* | 7/2005 | Wu et al. | ........................ | 709/213 |
| 6,975,611 B1* | 12/2005 | Balachandran et al. | ....... | 370/337 |
| 6,975,868 B2* | 12/2005 | Joshi et al. | .................. | 455/452.1 |
| 7,311,246 B2* | 12/2007 | Arisawa | .......................... | 235/379 |
| 7,362,733 B2* | 4/2008 | Kim et al. | ...................... | 370/335 |
| 7,457,238 B2* | 11/2008 | Maehara et al. | .............. | 370/229 |
| 7,769,700 B1* | 8/2010 | D'Amico et al. | ............. | 705/401 |
| 7,797,604 B2* | 9/2010 | Lee et al. | ....................... | 714/748 |

FOREIGN PATENT DOCUMENTS

| | | |
|---|---|---|
| JP | 61-283250 | 12/1986 |
| JP | 5-28102 | 2/1993 |
| JP | 06-232879 | 8/1994 |
| JP | 2000-151665 | 5/2000 |
| JP | 2001-223726 | 8/2001 |
| JP | 2002-73584 | 3/2002 |
| JP | 2002-124935 | 4/2002 |
| JP | 2003-163673 | 6/2003 |
| JP | 2005-101803 | 4/2005 |

OTHER PUBLICATIONS

CUnet IC MKY40 User's Manual STD-CU40-V2.1E.

\* cited by examiner

*Primary Examiner* — Esaw Abraham
(74) *Attorney, Agent, or Firm* — Antonelli, Terry, Stout & Kraus, LLP.

(57) ABSTRACT

A data communications system having a plurality of processing devices connected to a serial via a serial bus interface. The processing device provides a communication control line which connects each processing device in order and performs the transfer of transmission right of the serial bus, a transmission right management unit which is connected to the communication control line, performs the transfer of the transmission right and manages the state of the transmission right within its own processing device, a data transmission unit which starts data transmission when the transmission right is valid and holds the data transmission when the transmission right is invalid, and a state initialization unit which sets the initial state of the transmission right so that the transmission right of only one processing device is made to be valid at the initialization.

7 Claims, 7 Drawing Sheets

EXAMPLE OF DATA WRITE PROCESS TO MEMORY

FIG. 3

EXAMPLE OF TRANSMISSION RIGHT MANAGEMENT PROCESS

EXAMPLE OF DATA RECEIVING PROCESS

EXAMPLE OF RETRANSMISSION PROCESS

DATA COMMUNICATIONS SYSTEM AND DATA COMMUNICATIONS METHOD BETWEEN DISTRIBUTED CONTROLLERS CONNECTED BY SERIAL BUS

BACKGROUND OF THE INVENTION

The present invention relates to a data communications system and a data communications method to share memory data in real time between a plurality of distributed controllers connected by a serial bus.

In built-in control equipment such as a robot, etc. on which multiple devices such as a sensor, an actuator, etc. are mounted and which needs complicated control using those devices, a configuration which performs cooperative control controlling those multiple devices by dividing them in some distributed controllers and having them communicate with each other is often adopted. There are some reasons why the configuration of distributed control type like this is adopted, but the reasons particularly important as built-in control are to make the equipment smaller by alleviating the concentration of wiring, to improve the noise problem with the shortening of the wiring distance, and to enhance the reliability. Also, in order to realize the configuration of distributed control type, it is necessary that the communication between the distributed controllers can be realized in real time (low latency) and the effective communication speed is fast, and the load of each controller which is needed for the communication process is small.

In a configuration in which multiple devices are controlled by a single controller, as the signal lines to connect to each device have to be wired in concentration in a controller part, a large idle space to lead around the multiple signal lines in concentration has to be secured on the periphery of the controller. Further, a wiring space to lead around the wire bundle which is bundled up thick from the end part of the equipment to the controller part in the center is needed. Also, in the wire within the apparatus which has a movable joint part such as a manipulator of the robot, as the wire length and the spatial room in order to prevent the excessive force from being loaded on the wire bundle in the movable area become necessary when passing the wire bundle on inner side of the movable joint, the joint structure becomes bigger. From these reasons, in the configuration of concentrated control type, it is difficult to make the equipment smaller.

Also, there is a case where a big noise is irradiated to the periphery from a large current wire such as an actuator driving line. Therefore, when a micro analog signal line of a sensor, etc. and a large current wire such as an actuator driving line are wired in long distance from the end part of the equipment to the controller part, there is a case where the noise irradiated from the large current wire mixes into the analog signal line and becomes a cause of the malfunction, and the reliability of the equipment is deteriorated.

From these reasons, a configuration in which the controllers are distributed per each part of the equipment and the device which belongs to a particular part is controlled being wired to a controller installed near the device is adopted. Also, when the cooperative control is performed using information of the device which is over a plurality of parts, the data is transferred to and from each other via communication buses between the controllers. On this occasion, as it is necessary to arrange each controller physically distributing them according to the arrangement of the corresponding device, a serial bus which has a small wiring amount and is adequate for the long distance wiring is often adopted as a communication bus between the controllers. In this way, in the distributed controller system which performs the cooperative control by the communication via the serial bus, it is necessary that the communication is sufficiently in real time (with low latency) to realize the sufficiently short control circle and that the load of the controller which is needed for the communication process is small in the degree that it does not become an obstacle for the primary control process, and it is important in which method the communication is performed.

Presently, one of the communication methods which are most popular is LAN (Local Area Network) using Ethernet (registered trademark) (trademark: Ethernet (registered trademark), a standard 100BASE-TX is standardized as IEEE802.3u). As Ethernet (registered trademark) adopts CSMA/CD (Carrier Sense Multiple Access/Collision Detection) method, it has a problem that the worst value of the communication delay time (latency) is unpredictable in addition to that when the communication data amount is increased the data collision often occurs and the utilization ratio of the bus is deteriorated. Therefore, Ethernet (registered trademark) is not adequate as a communication method for the built-in control. Also, one of the communication control methods of LAN which solved the problem of the data collision is Token Ring (Token Ring, a standard which is standardized by IEEE802.5). Data called "token" which indicates transmission right flows in the network and a terminal which wants to transmit data fetches the token and transmits the data and after the transmission is completed it lets the token flow in the network again. Thereby it is controlled so that only one terminal uses the network at a time and the problem of the data collision is solved. However, the token is a data which has a certain length and as it flows in the same line as the communication data, the load is put on the communication path. Further, as the data is transmitted on the network in order, there is a problem that the communication latency is large.

Also, as in both Ethernet (registered trademark) and Token Ring the indication of destination of data transfer, the data transmission process, the response process, the error correction process, etc. are all controlled by software, the load of the processor is large. Therefore, when the hardware of the body of the equipment and the software to be built in the controller, etc. are developed in parallel at the same time, it is difficult to separate the cause when the fault has occurred.

In JP-A-2002-73584 it is disclosed about an example of a plurality of stations memory data shared system in which the memory data is shared between a plurality of stations by connecting a plurality of controllers (stations) on which memories are mounted by a serial bus and mounting hardware which periodically copies the memory data which each station holds to corresponding area of the memory of other stations in order to solve the above-mentioned problems. In Step Technica, Inc. technical document (STD-CU40-V2.1J) "Cunet user's manual (MKY40)", it is disclosed about the product embodiment regarding the plurality of stations memory data shared system.

SUMMARY OF THE INVENTION

In the above-mentioned conventional method, the load of the software becomes none by making the communication process of the serial bus to be performed by hardware and the communication latency becomes clear by that the copy cycle of the memory data is fixed. However, as the method makes the memory data of all the stations be consistent by periodically transmitting all the memory data shared between the plurality of stations on the serial bus, there is a problem that the delay time (latency) to reflect the data written in the memory of a certain station to the memory of other stations increases in proportion to the capacity of the memories which share the data.

The present invention has been invented taking these points into consideration and it aims at realizing a data communications system which realizes at the same time (1) to have the small worst latency of the communication not being affected from the amount of the shared data being large or small, and to realize the fast communication speed, (2) to have the small software load of the processor, and (3) to adopt the serial connection method which has small wiring amount and is advantageous to the small space mounting.

(1) A data communications system in which a plurality of processing devices comprising a serial bus interface, a storage unit to store data, and a processing unit to transmit an access request to said storage unit are connected to each other via a serial bus, wherein:

a communication control line which daisy chain connects between said processing devices and performs the transfer of transmission right which permits data transmission to the serial bus is provided, and said processing device is configured comprising a transmission right management unit which performs the transfer of the transmission right between other processing devices connected via said communication control line and manages a state of the transmission right within its own processing device, an interface unit which when a write access request is made from said processing unit to said storage unit, writes data to said storage unit and at the same time generates a data transmission request to which an address of write destination and data are added and when a read access request is made from said processing unit to said storage unit, reads out corresponding data from said storage unit and passes the same to said processing unit, a data transmission unit which receives said data transmission request and when the transmission right of its own processing device is valid starts data transmission to the serial bus, and when the transmission right is invalid holds data transmission until the transmission right becomes valid, a data receiving unit which receives data transmitted from other processing devices connected to the serial bus and stores the same in said storage unit, and a state initialization unit which sets an initial state of its own processing device so that only the transmission right of one processing device is valid among the plurality of processing devices connected to the serial bus at the initialization.

(2) Said transmission right management unit performs a process which receives a transmission right transfer signal from an adjacent processing device via said communication control line and validates the transmission right of its own processing device, a process which determines the state of said data transmission unit and when there is no hold transmission data transmits the transmission right transfer signal to a processing device which is adjacent to the opposite side of the processing device from which the transmission right transfer signal is received, and when there is hold transmission data starts data transmission of said data transmission unit and transmits the transmission right transfer signal to the processing device which is adjacent to the opposite side after the transmission of the data is completed, and a process which invalidates the transmission right of its own processing device at the same time as the transmission of the transmission right transfer signal.

(3) Said communication control line is connected not in a ring form but in the way that at the processing device of an end part one communication control line is in an open state, said state initialization unit is configured comprising an open detection unit which detects that said communication control line is in the open state, and a transmission right initialization unit which sets the initial state so that when among two communication control lines a first communication control line is in the open state, it validates the transmission right of its own processing device at the initialization, and when the first communication control line is not in the open state, it invalidates the transmission right of its own processing device at the initialization, said transmission right management unit, in the process to transmits the transmission right transfer signal to the adjacent processing device, when one communication control line is in the open state, after receiving the transmission right transfer signal from the other communication control line, performs a process which transmits the transmission right transfer signal to the communication control line on the side from which the transmission right transfer signal is received by return.

(4) Said processing device is provided with a received address buffer which holds address information of received data which is received from said data receiving unit for a plurality of times, a code generation unit which generates a correction code based on address and data which said transmission unit transmits and adds the same to the transmission data, an error correction unit which determines the existence of communication error based on the address and data and correction code which said data receiving unit received, performs error correction when a communication error has occurred and error correction using the correction code is possible, and generates an error signal when a communication error has occurred and error correction is impossible, a retransmission request generation unit which on receiving the error signal which said error correction unit generated generates a retransmission request command which includes information about in which received data of how many times before the error occurred and transmits the same to said data transmission unit, a retransmission address generation unit which, when said data receiving unit received the retransmission request command, determines the data which needs to be retransmitted is the received data of how many times before and obtains storage address of the data which needs to be retransmitted referring to said received address buffer, a retransmission request cancel unit which on receiving the address obtained by said retransmission address generation unit refers to said data transmission unit and when the retransmission request command of the same address as the obtained address is in transmission hold, outputs a transmission cancel request of the retransmission request command which is held in said data transmission unit, and a data retransmission unit which refers to the storage address of the data which needs to be retransmitted which said retransmission address generation unit obtained and history of said received address buffer, and when it did not receive data of the same address as the address of retransmission object after receiving the retransmission request command, reads out data of said address from said storage unit and generates that address and data as retransmission data for the retransmission request and transmits the same to said data transmission unit.

In the present invention, it is possible to avoid the data collision without increasing the load to the data communications of the serial bus by performing the transfer of the transmission right providing the communication control lines between the plurality of processing devices connected by the serial bus. By avoiding the data collision which is the cause to deteriorate the utilization efficiency of the bus, the effective data communication speed is enhanced and at the same time the data retransmission process does not occur and it is possible to make the worst latency of the communication small.

Also, by providing the processing device with a processor which is a processing unit and a memory which is a storage unit, by transmitting the write data to the memory to the serial bus when writing data from the processor to the memory, and by providing a unit to write to the memory within its own processing device when the transmission data from the other processing devices connected to the serial bus is received, it is possible to automatically make the memory contents of all the processing devices connected to the serial bus be consistent without the load of the processor. Further, as the serial bus is used only when the data is rewritten in this method, being different from the method to periodically transmit all the memory data to the serial bus like the method described in JP-A-2002-73584, even if the size of the shared memory is increased, it does not adversely affect the latency and the effective data communication speed.

In the present invention, if the data size which one processing device can change at a time is limited (for example, one data), the chance to change the data is equally given to each processing device connected to the serial bus. When a large amount of data is changed at one processing device, there is a case where the latency is increased because the wait has occurred, but the worst value of the latency which will be increased is predictable based on only the information regarding the process which that processing device intends to perform. Therefore, the worst latency in the case where it is limited to change only one data is easily predictable because it only depends on the number of the devices connected to the serial bus and it is adequate for the control use.

Also, according to the present invention, it is possible to realize the detection and correction of the communication error and the retransmission function by hardware. In the present invention, when the processing device which changed the data transmits the data to the serial bus, all the processing devices other than the processing device which transmitted receive the data simultaneously. The processing device which received the data individually performs the error detection/correction but when it detects an error which it cannot correct, transmits a retransmission request command when the transmission right comes around. On the other hand, as all the processing devices which could receive the data normally hold normal data, the processing device to which the transmission right comes around first after the retransmission request command was transmitted (it does not need to be the device which transmitted the changed data) can perform the retransmission. Also, even when the received data cannot be corrected, when the retransmission request of said data was sent out from the other processing device before the transmission right comes around to its own processing device, the retransmission is not requested in duplication for the same data and it waits for that the retransmission data is transmitted from the other processing device. Thereby the error detection/correction process and the retransmission process which conventionally become the load to the software all can be turned over to the hardware. Also, the error detection/correction process and the retransmission process are performed individually by the processing devices, but they are performed by all the processing devices connected to the serial bus in cooperation, the duplication of the retransmission process, etc. does not occur and the process can be performed promptly.

Also, it becomes possible to precisely calculate the increased amount of the worst latency by the data retransmission.

Other objects, features and advantages of the invention will become apparent from the following description of the embodiments of the invention taken in conjunction with accompanying drawings.

DETAILED DESCRIPTION OF THE INVENTION

One embodiment of the present invention will be explained below referring to accompanying drawings.

Figure 1:
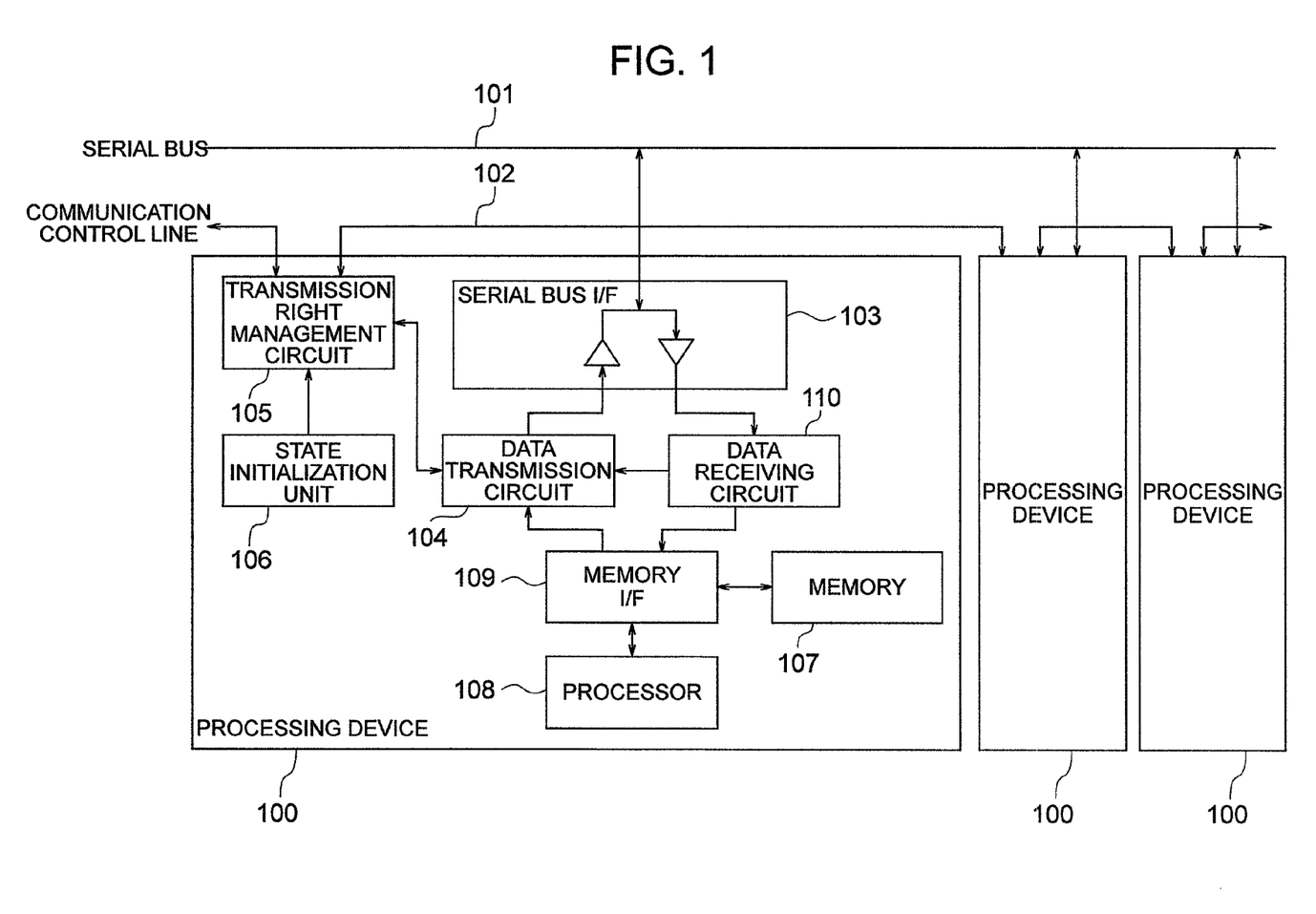
FIG. 1 is a block diagram showing an example of configuration according to one embodiment of the present invention.

FIG. 1 shows an example of configuration of a data communications system of this embodiment. This embodiment is configured in that a plurality of processing devices 100 are connected to a serial bus 101 via a serial bus interface (I/F) 103, and between each processing device 100 it is sequentially chained, for example like a daisy chain, by communication control line 102 which performs the transfer of the data transmission right of the serial bus 101. Although the end part of the communication control line 102 is in the open state in FIG. 1, it is also possible to configure connecting the communication control line of the open part to each other and making it in the ring form.

Next, it will be explained about the configuration of the processing device 100 referring to FIG. 1. Here, as the processing devices connected to the serial bus 101 all have the same configuration, the configuration of one processing device will be explained and the explanations of the other processing devices will be omitted. The processing device 100 is configured comprising the serial bus I/F 103 to connect to the serial bus 101, a transmission right management circuit 105 which is a transmission right management unit which connects to the communication control line 102, performs the transfer of the transmission right, and manages the state of the transmission right within its own processing device, a state initialization unit 106 which sets the initial state of the transmission right of its own processing device at the initialization, a data transmission circuit 104 which is a data transmission unit to transmit data via the serial bus I/F 103, a data receiving circuit 110 which is a data receiving unit to receive data via the serial bus I/F 103, a memory 107 which is a storage unit to store data, a processor 108 which is a processing unit to output an access request to the memory 107, and a memory interface (I/F) 109 which receives the access request from the processor 108 and performs input/output of data to and from the memory 107.

Next, it will be explained about an example of operation of the shared process of the memory data when a memory data sharing system of distributed type is configured according to this embodiment. When the memory data sharing system of distributed type is configured applying this embodiment, the memories which are mounted on all the processing devices connected to the serial bus will all have the same contents. Also, all the processing devices can read and write all the areas of the memory and when the contents of the memory are changed the changed contents will be reflected to the memory within the other processing devices by a communication process of this embodiment.

First, it will be explained about a process when the processor 108 reads out data of the memory 107. When the processor 108 reads out data of the memory 107, it indicates the address of the memory which it wants to read out to the memory I/F 109 and outputs a readout request of data. The memory I/F 109 reads out data of the indicated address from the memory 107 and passes the readout data to the processor 108.

Figure 2:
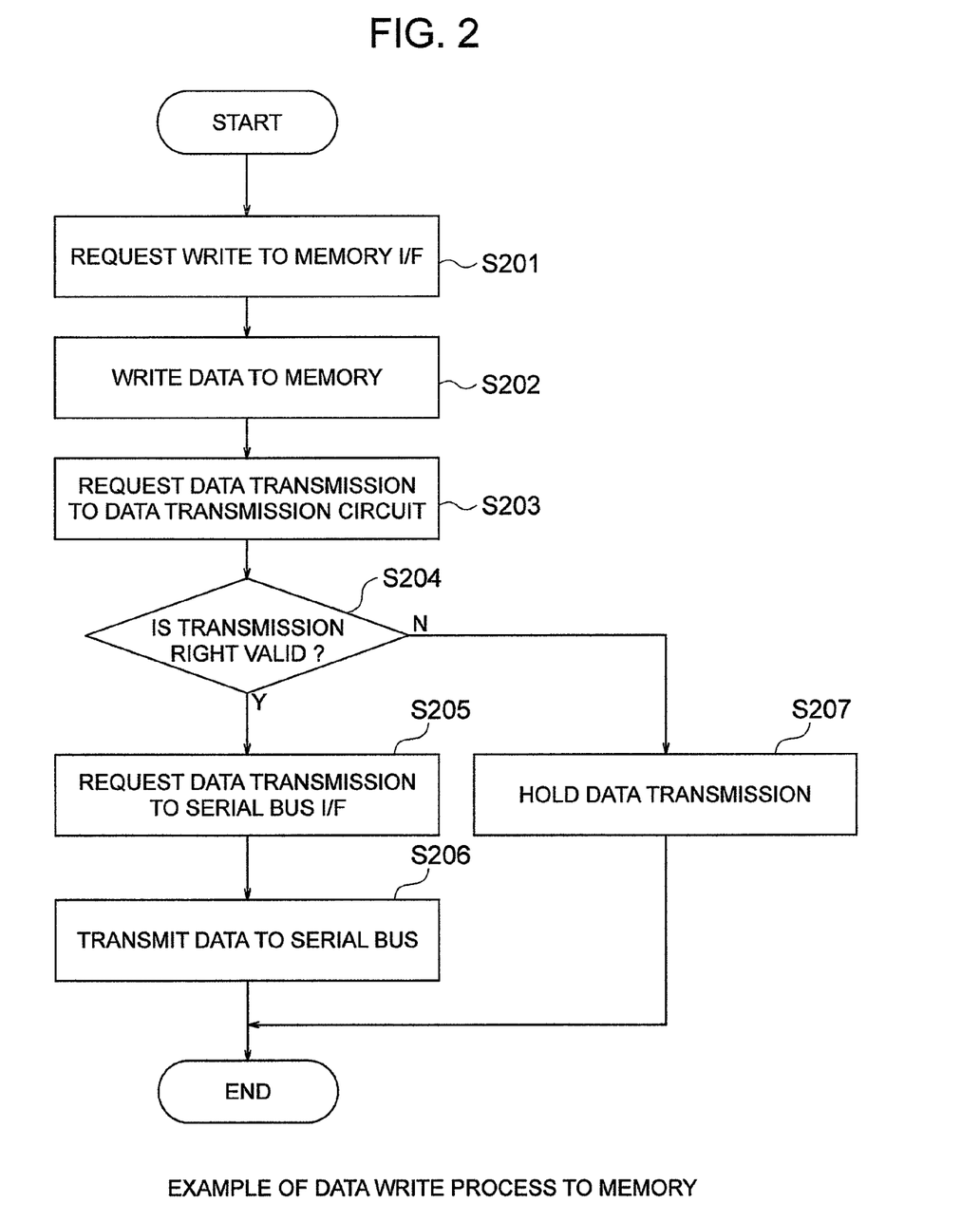
FIG. 2 is a flow chart showing an example of data write process to a memory according to one embodiment of the present invention.

Next, it will be explained about a process when the processor 108 writes data to the memory 107 referring to FIG. 2. FIG. 2 is a flow chart showing an example of data write process to the memory when the processor 108 writes data to the memory 107.

When the processor 108 writes data to the memory 107, first, it indicates data which it wants to write and its address to the memory I/F 109 and outputs a write request of data (step S201). The memory I/F 109 writes the data to the indicated address of the memory 107 (step S202), passes the address and data which it wrote to the memory 107 to the data transmission circuit 104, and requests transmission to the serial bus 101 (step S203). The data transmission circuit 104, on receiving the address and data from the memory I/F 109, determines the state of the serial bus transmission right of its own processing device which the transmission right management circuit 105 holds (step S204) and when the transmission right is valid, passes the address and data to the serial bus I/F 103 and requests data transmission (step S205). The serial bus I/F 103, on receiving the transmission request from the data transmission circuit 104, transmits the data to the serial bus 101 (step S206). When the transmission right is invalid as a result of the determination of the step S204, the transmission to the serial bus 101 is temporarily held (step S207). When the transmission is held, the transmission will be started at the time point when the transmission becomes valid. Here, it will be explained later about a method to manage the state of the transmission right and a transmission method of the hold transmission data.

Next, it will be explained about a receiving process of data. When data is transmitted from the processing device 100 connected to the serial bus 101, all the other processing devices connected to the serial bus 101 receive that data. The data transmitted from a certain processing device is input to the serial bus I/F 103 of the other processing devices 100 via the serial bus 101 and transferred to the data receiving circuit 110. The data receiving circuit 110 receives the address and data which the other processing device 100 transmitted from the serial bus I/F 103 and instructs the write of the data to the memory 107 to the memory I/F 109 based on that data. The memory I/F 109 writes the data to the indicated address of the memory 107.

By these operations, the memory data which the processor 108 of a certain processing device changed is reflected to the memory of all the other processing devices connected to the serial bus 101 on all such occasions and they can share the changed data.

Next, it will be explained about a management method of the transmission right by the transmission right management circuit 105. As the transmission right management circuit 105 is connected to the transmission right management circuits 105 within the adjacent processing devices on both sides by the bidirectional communication control line 102 respectively, it is supposed that to the transmission right management circuit 105 two communication control lines 102 are connected. The transmission right management circuit 105 transfers the transmission right in order by receiving and transmitting a transmission right transfer signal via the communication control line 102.

First, the transmission right management circuit 105 is initialized so that only one among the plurality of processing devices 100 connected to the same serial bus 101 has the valid serial bus transmission right by the work of the state initialization unit 106. After the initialization, it transfers the transmission right transfer signal in order from the processing device of which transmission right has become valid.

As a process of the state initialization unit 106, for example, when the communication control line 102 is connected in the ring form, it may be processed to previously set an initialization value of the transmission right such as to make the transmission right of one designated processing device valid in a storage device such as a memory and the state initialization unit 106 may process to refer to that initialization value and set the initialization state. Also, when the communication control line 102 is not in the ring form and at the processing device of the end part one communication control line is in the open state, at the state initialization unit 106, it detects whether the communication control line is in the open state or not and it may set the initial state so that when a first communication control line among the two communication control lines is in the open state, it makes the state of the transmission right at the initialization valid, and when the first communication control line is not in the open state, it makes the state of the transmission right at the initialization invalid. By setting it in this way, the transmission right of only one processing device can be set to be valid at the initialization.

Figure 3:
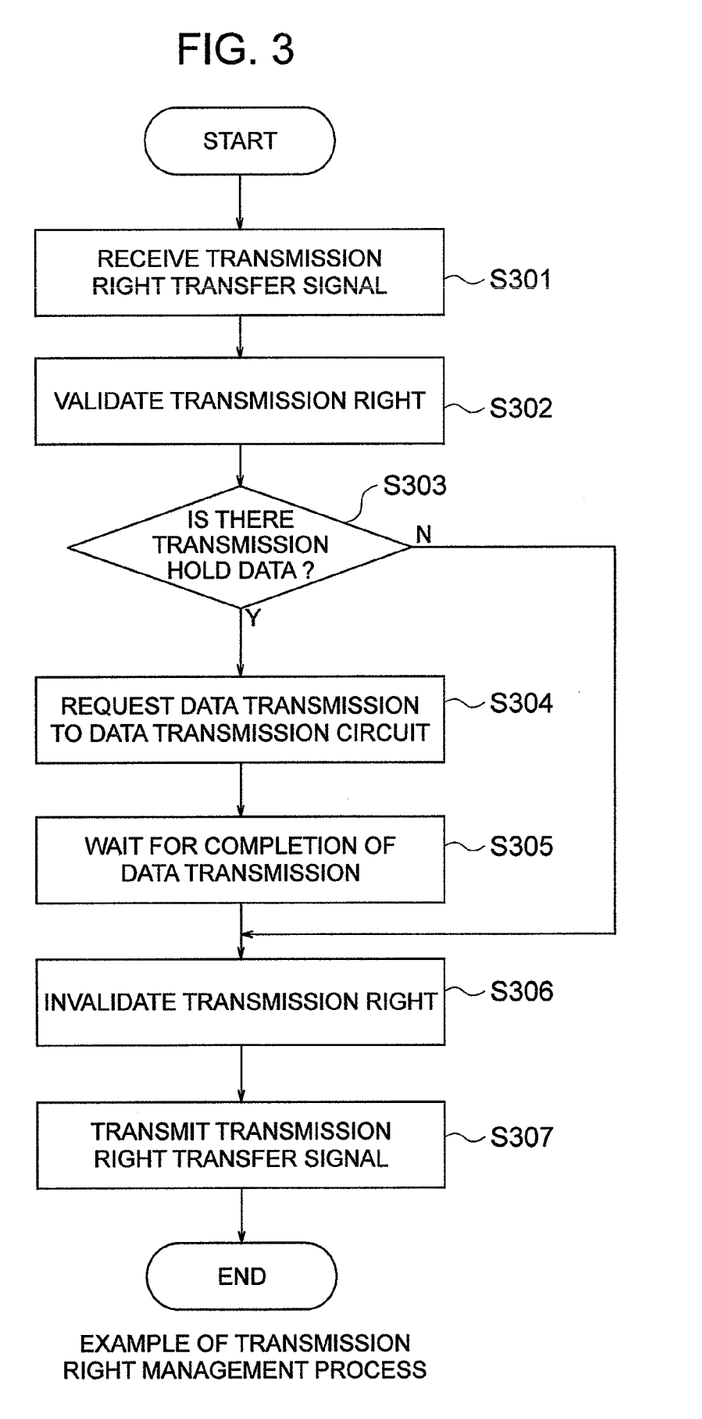
FIG. 3 is a flow chart showing an example of transmission right management process according to one embodiment of the present invention.

Next, it will be explained about a management method of the transmission right after the initialization and a transmission method of the hold transmission data referring to FIG. 3. FIG. 3 is a flow chart showing an example of transmission right management process of the transmission right management circuit 105.

First, the transmission right management circuit 105 receives the transmission right transfer signal from the adjacent processing device connected to the first communication control line 102 (step S301) and makes the state of the transmission right of its own processing device valid (step S302). The transmission right management circuit 105 with its transmission right valid determines whether there is transmission hold data or not referring to the state of the data transmission circuit 104 (step S303) and when there is data which is in transmission hold, instructs the start of the transmission of the hold data to the data transmission circuit 104 (step S304) and waits for the completion of the data transmission (step S305). After the data transmission is completed, it invalidates the transmission right (step S306) and sends out the transmission right transfer signal to the adjacent processing device connected to a second communication control line 102 (step S307). When there is no transmission hold data as a result of the determination of the existence of the transmission hold data at the step S303, it invalidates the transmission right of its own processing device immediately (step S306) and sends out the transmission right transfer signal (step S307).

Figure 4:
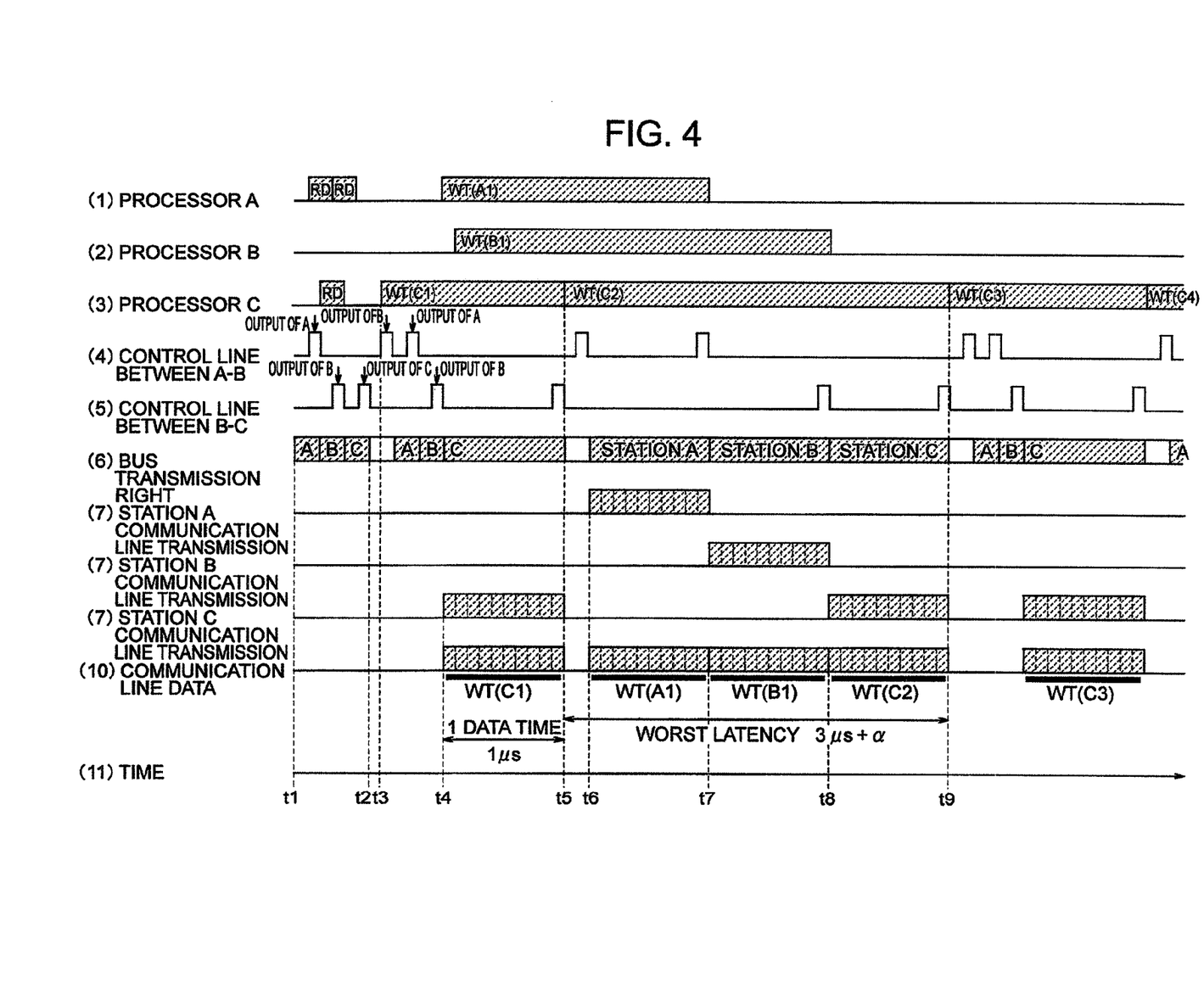
FIG. 4 is an explanation diagram showing access timing of data communications according to one embodiment of the present invention.

FIG. 4 shows an example of timing of the signal which flows in the serial bus 101 and the communication control line 102 at the data communications according to this embodiment. Here, it is assumed that three processing devices (A~C) are connected to the serial bus 101 and the processors 108 of each processing device are called processors A~C. Also, it is shown an example in which the communication control line which connects between each processing device is not in the ring form but at the processing device in the end part, here the processing devices A and C, one communication control line is in the open state.

The wave forms (1)~(3) in the drawing show the memory access timing of processors A~C, "RD" denotes the readout of the memory data and "WT" denotes the write of data to the memory. (4) and (5) show the movement of the signal of the communication control line between the processing devices A-B and between B-C. The first signal of (4) indicates that the transmission right transfer signal is sent out from the processing device A to B and the first signal of (5) indicates that the transmission right transfer signal is sent out from the processing device B to C. Also, (6) is a transition state of the processing device of which serial bus transmission right is valid and it can be seen that the transmission right is transferred in the order of processing devices A→B→C according to the transmission of the transmission right transfer signal denoted by (4), (5). (7)~(9) denote the signals which the processing devices A~C output to the serial bus 101 respectively and (10) denotes the one which is configured joining (7)~(9), namely the data which flows in the serial bus 101. (11) denotes the time.

At times t1~t2, as it is shown in the first parts of the wave forms (1)~(3), although the read access timings of the processor A and the processor C are duplicated, as the read access has the structure which completes within each processing device, the mutual interference would not occur. Also at this time, as none of the processing devices has the data to be transmitted to the serial bus 101, the bus transmission right promptly goes round in the order of A→B→C→A→B→C without waiting time.

Here, in this embodiment, the transmission right is transferred A→B by that the processing device A outputs the transmission right transfer signal between A-B and it is transferred B→C by that the processing device B outputs the transmission right transfer signal between B-C, but as the processing device C has one of the communication control line in the open state and there is not an adjacent processing device, the transmission right is transferred in the opposite direction (C→B direction) by that it outputs the transmission right transfer signal between B-C. When the transmission right is transferred to the opposite direction, the processing device (B) which is on the way does not make the transmission right of its own processing device valid, sends out the transmission right transfer signal to the adjacent processing device on the opposite side, and returns the transmission right to the processing device (A) which is located in the other end part. Afterward, the transmission right of the processing device (A) is validated again and the transmission right is transferred in order. By processing like this, the transmission right goes round in the order of A→B→C→A→B→C and the chance to validate the transmission right can be equalized regarding the processing device located in the end part and the other processing devices.

In FIG. 4, it is the processor C that first outputs the memory write request. Time t3 when the processor C outputs the write request (C1) is the timing when the transmission right transfer signal is outputted to transfer the bus transmission right from the processing device B to A, and as the processing device C dose not have valid transmission right, the data transmission is held. The processing device C outputs the write data (C1) to the serial bus 101 at time t4 when the bus transmission right comes around next time. The processor C outputs the write requests C2, C3, C4 continuously following this, but as the data which can be transmitted when the transmission right is valid is limited to only one data, after the transmission of C1 data is terminated, the transmission is held after the write data (C2) and the bus transmission right is transferred to the processing device A.

On the other hand, while the write data (C1) is output to the serial bus 101, the processors A and B request memory write requests A1 and B1 respectively. As the processing device C has the transmission right while the write data (C1) is output, they wait for the transmission right to come around to its own processing device and output. The processing device A transmits write data (A1) to the serial bus 101 when the transmission right becomes valid at time t6, and the processing device B transmits write data (B1) when the transmission right becomes valid at time t7. When the output of the write data (B1) is terminated at time t8, the transmission right of the processing device C becomes valid and it transmits the write data (C2) which has been in transmission hold. After the transmission of C2 is terminated, the transmission is held after the write data (C3) and the bus transmission right is transferred. Then, next write data is transmitted at the time point when the transmission right comes around again.

In this way, by limiting the number of data which can be transmitted when the transmission right is valid, it is prevented that one processing device monopolizes the transmission right for a long time and the transmission timing of other processing devices are delayed.

The worst case of the communication delay time (latency) in this embodiment is the case like the above-mentioned transmission of the write data (C2) in the processing device C, and it is a case where its own processing device generates the write requests continuously, and as the other processing devices generate the write requests at the same time, all the processing devices including its own processing device transfer the transmission right after the data transmission and the data transmission is performed after the transmission right has gone round once. In FIG. 4, the time from when the write request (C2) is generated at time t5 to when the data transmission is completed at t9 is the maximum value of the latency. Its length is defined by the number of the processing devices connected to the serial bus 101 and the length of data which is allowed to be transmitted at a time.

For example, when the communication speed of the serial bus is 10 Mbps and 1 data which the processing device transmits at a time is configured as (start bit+8 bit data+stop bit), as 1 bit cycle becomes 100 ns, it becomes as following.

$$1 \text{ data cycle} = (\text{start bit} + 8 \text{ bit data} + \text{stop bit}) \times 100 \text{ ns}$$
$$= 1 \text{ μs}$$

In FIG. 4, as there are three processing devices connected to the serial bus 101, the maximum value of the latency becomes (3 μs+α). Here, α is the communication time of the transmission right transfer signal when the transmission right is transferred from the processing device C to A in this embodiment, and this time is the time when the transmission right of all the processing devices become invalid. The invalid time like this differs depending on the configuration of the system, but as it is fixed for each configuration, the maximum value of the latency of each is calculable.

Figure 5:
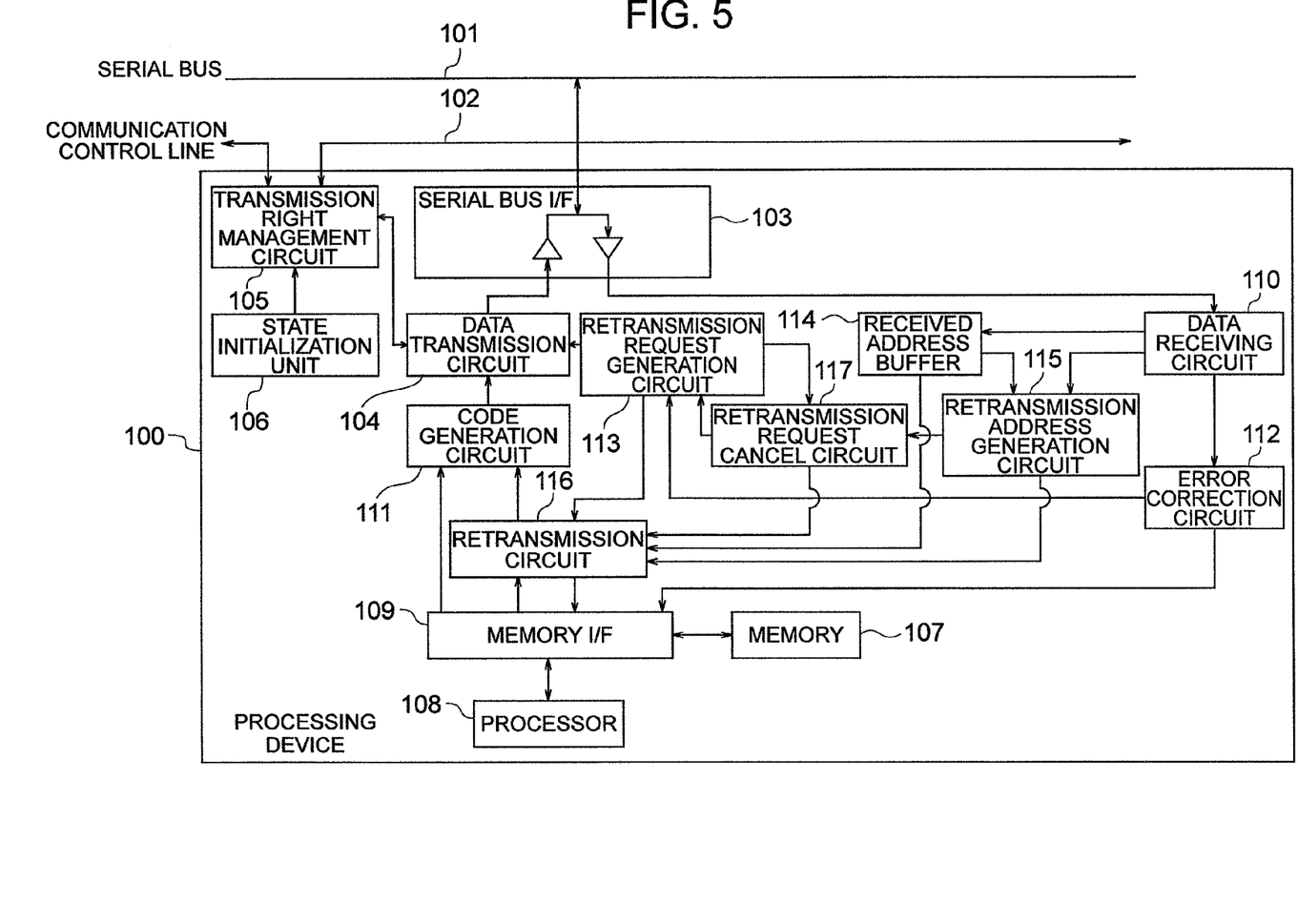
FIG. 5 is a block diagram showing an example of configuration according to another embodiment of the present invention.

Next, it will be explained about the data communications system which has a communication error detection/correction unit according to other embodiment of this example. FIG. 5 shows an example of configuration of the data communications system to which a communication error detection/correction function is added. Here, to the same configurations as the data communications system shown in FIG. 1 the same signs are attached and their explanations will be omitted.

In this embodiment, in order to realize the communication error detection/correction function, in the processing device 100 connected to the serial bus 101, a received address buffer 114 which holds data and address information received from the data receiving circuit 110 for a plurality of times, a code generation circuit 111 which is a code generation unit which generates a correction code based on the data to be transmitted, adds it to the transmission data and passes the same to the data transmission circuit 104, an error correction circuit 112 which is an error correction unit which inspects the existence of error based on the correction code added to the data which the data receiving circuit 110 received and performs the error correction, and a retransmission request generation circuit 113 which is a retransmission request generation unit which generates a retransmission request command and makes a data transmission request for a communication error which cannot be corrected at the error correction circuit 112 are provided.

Also, in order to realize the retransmission function of data when the retransmission request command is received, a retransmission address generation circuit 115 which is a retransmission address generation unit which obtains a storage address of the data which needs to be retransmitted based on the retransmission request command which the data receiving circuit 110 received and a retransmission circuit 116 which is a data retransmission unit which reads out data from the memory based on the address indicated from the retransmission address generation circuit 115, generates retransmission data and transmits it to the code generation circuit 111, and makes a data transmission request are provided. Further, a retransmission request cancel circuit 117 which is a retransmission request cancel unit is provided in order to avoid that the data is retransmitted in duplication when the communication errors of the same data have occurred in the plurality of processing devices.

Next, it will be explained about an example of operation of each circuit which configures this embodiment.

The code generation circuit 111 has the data to be transmitted to the serial bus 101 input, generates the correction code based on that data, adds it to the data and transmits the same to the data transmission circuit 104. For example, when the write data to the memory is to be transmitted, it adds the correction code to the data transmitted from the memory I/F 109 and transmits the same to the data transmission circuit 104.

The data receiving circuit 110, when the received data is the memory data, stores its memory address in the received address buffer 114, and at the same time passes the received data to the error correction circuit 112. The received address buffer 114 is a ring buffer, and it stores the receiving history of the received data for a few times in the past and the storage address on the memory of that data can be referred to based on the information about how many times before the data was received. Also, the data receiving circuit 110, when the received data is the retransmission request command, passes the data of the received retransmission request command to the retransmission address generation circuit 115.

The error correction circuit 112 has the data received from the data receiving circuit 110 input and inspects the existence of the communication error based on the correction code added to the received data. As a result of the inspection, when the communication error has occurred and the error correction based on the correction code is possible, it performs the error correction and instructs the data write to the memory 107 to the memory I/F 109. When a communication error which cannot be corrected by the correction code has occurred, it instructs the generation of the retransmission request command to the retransmission request generation circuit 113.

The retransmission request generation circuit 113 receives the correction failure information and the data receiving information afterwards from the error correction circuit 112, generates a retransmission request command to which information regarding how many times before the data which cannot be corrected was transmitted is added, and transmits it to the data transmission circuit 104. The data transmission circuit 104 transmits the retransmission request command after waiting for that the transmission right becomes valid. At this time, as there is a case where new data is received before the transmission right becomes valid, it receives the data receiving information from the error correction circuit 112 every time it receives data and updates the information regarding how many times before it was transmitted which is added to the retransmission request command in the transmission hold.

The retransmission address generation circuit 115 has the retransmission request command which the data receiving circuit 110 received input and generates the address of the memory data to be retransmitted. As the information regarding that the data to be the retransmission object was transmitted to the serial bus how many times before the time point when the retransmission request command is transmitted is added to the retransmission request command, it refers to the received address buffer 114 based on that information and obtains the storage address on the memory of the data which is the retransmission object. It transmits the obtained storage address to the retransmission circuit 116 and instructs the retransmission. On the other hand, when the retransmission process which has the same data as the received retransmission request command as an object has already been performed, it is necessary to avoid the duplication of the retransmission process. For this reason, it passes the received retransmission request command and address and instructs the cancel process to the retransmission request cancel circuit 117.

The retransmission circuit 116, first refers to the received address buffer 114 based on the storage address indicated from the retransmission address generation circuit 115 and confirms whether data of the same address as the address which received the retransmission request is received after receiving the retransmission request command or not. When the data of the same address has not been received, it reads out the data from the memory 107 via the memory I/F 109 and transmits it to the code generation circuit 111 as retransmission data. The code generation circuit 111 adds the correction code to the transmitted retransmission data in the same way as the normal memory data transmission and transmits it to the data transmission circuit 104. The data transmission circuit 104 transmits the retransmission data after waiting for that the transmission right is validated. When the retransmission circuit 116 detects that it received the data of the same address as the data which is the retransmission object after receiving the retransmission request command, the retransmission of the data is terminated. Thereby it can be avoided that the plurality of retransmission data for the same data are sent out to the serial bus.

The retransmission request cancel circuit 117, on receiving the retransmission request command and address from the retransmission address generation circuit 115, refers to the retransmission request generation circuit 113 and confirms whether the retransmission request command which has the same data as an object is in the transmission hold state or not. More specifically, it compares the retransmission request command which the retransmission request generation circuit 113 generated with the retransmission address information which the retransmission address generation circuit 115 generated and when the memory addresses which are to be the objects of the retransmission match, it determines that they are the same data. As a result, when the retransmission request command of the same data is in the hold state, it instructs the cancel of the retransmission request command to the retransmission request generation circuit 113. Further, it instructs to cancel the retransmission process corresponding to the received retransmission request command to the retransmission circuit 116. Thereby it can be avoided that a plurality of retransmission requests for the same data are sent out to the serial bus. Also, in its own processing device, it can be prevented to retransmit the wrong data by terminating the retransmission process regarding the data which could not be normally received because of the communication error.

Figure 6:
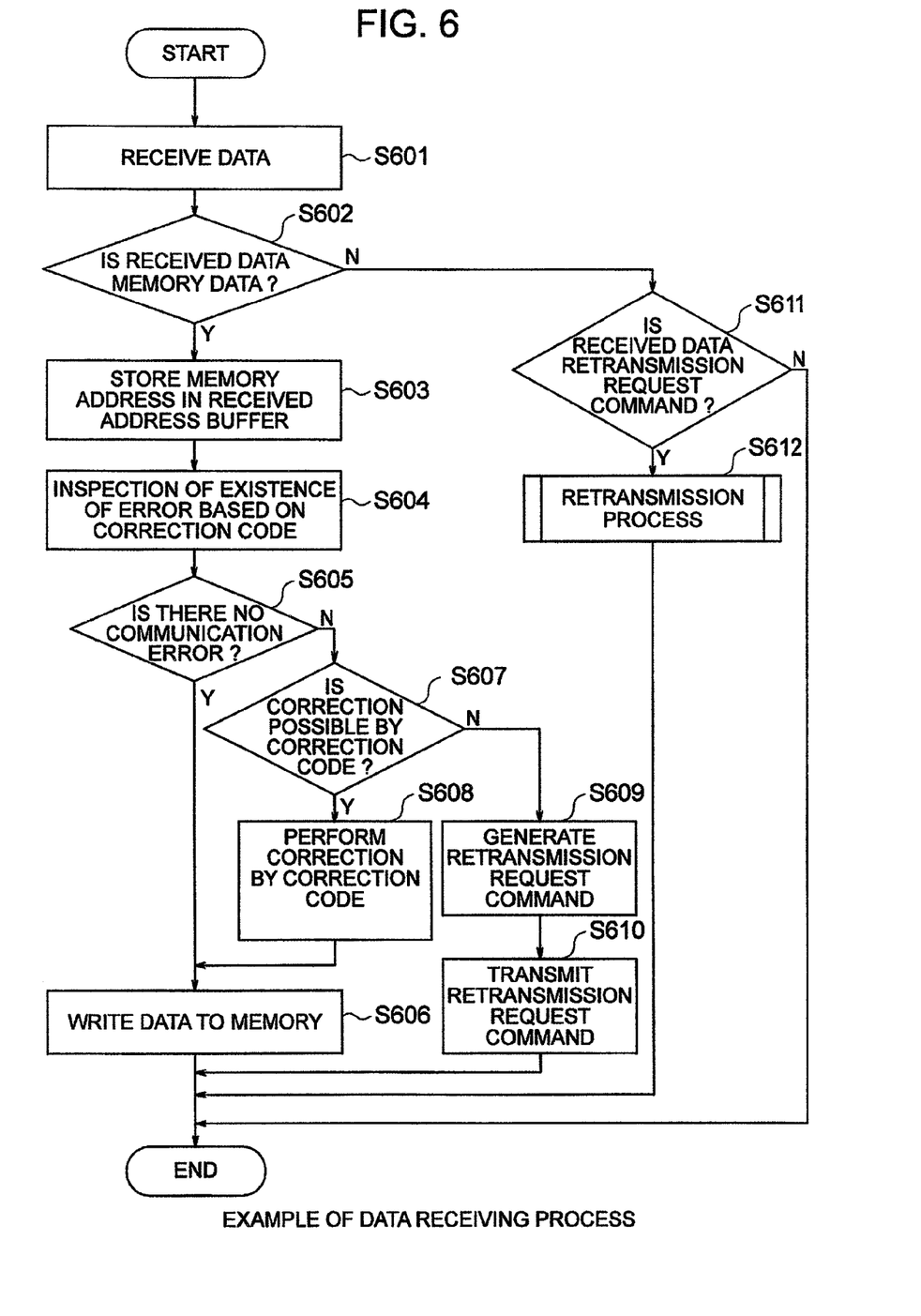
FIG. 6 is a flow chart showing an example of data receiving process according to another embodiment of the present invention.
Figure 7:
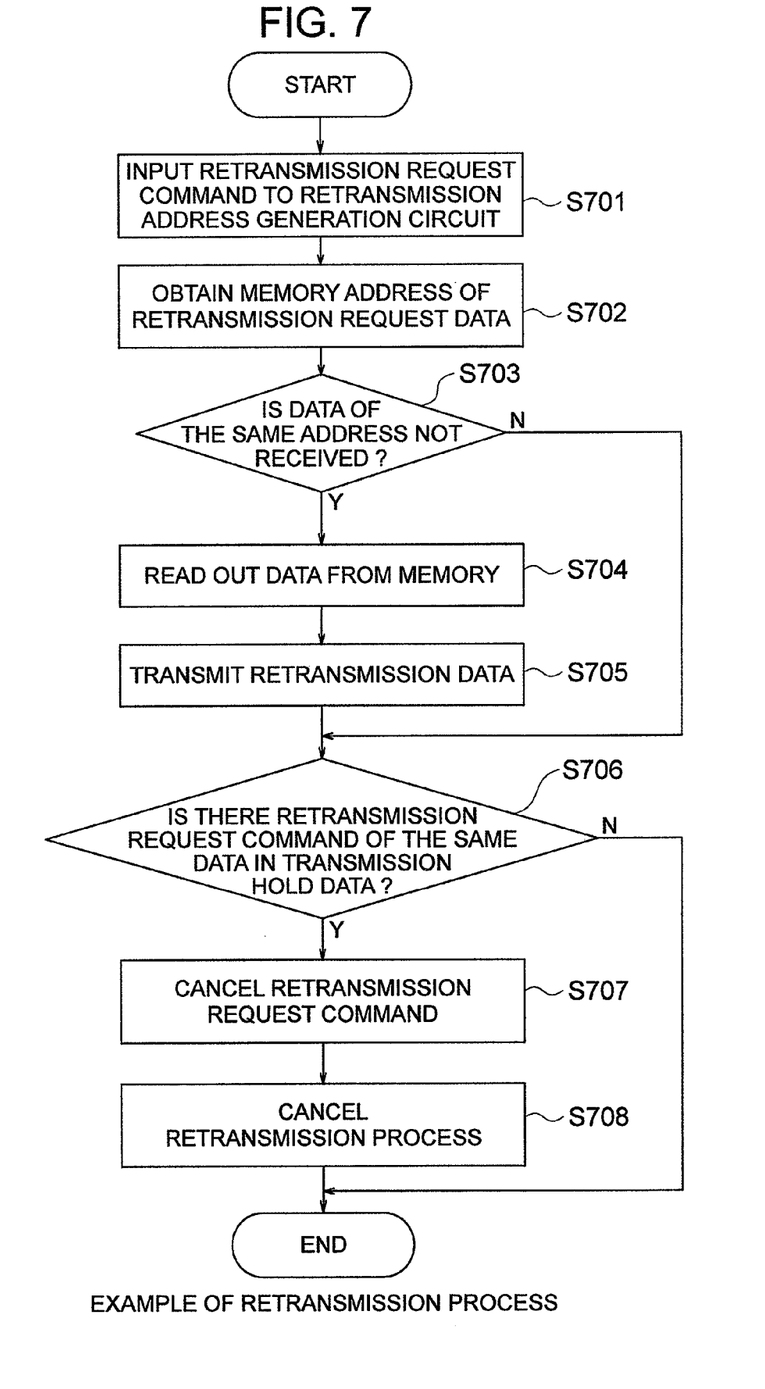
FIG. 7 is a flow chart showing an example of retransmission process according to another embodiment of the present invention.

Next, it will be explained about a communication error detection/correction process according to this embodiment referring to FIGS. 6 and 7. First, it will be explained about a process when the data is received referring to FIG. 6. FIG. 6 is a flow chart showing an example of data receiving process of this embodiment.

First, the data receiving circuit 110 receives the data (step S601). It determines whether the received data is the memory data or not (step S602), when it is the memory data, it stores the memory address in the received address buffer 114 (step S603). Next, the error correction circuit 112 has the data which the data receiving circuit 110 received input and inspects the existence of the communication error based on the correction code (step S604). As a result of the inspection, it determines whether there is a communication error or not (step S605), and when there is no communication error, the data is written to the memory 107 via the memory I/F 109 (step S606) and the process is terminated. As a result of the determination of the step S605 when there is a communication error, it determines whether the correction by the correction code is possible or not (step s607), and if the correction is possible, the correction by the correction code is performed at the error correction circuit 112 (step S608), the data is written to the memory (step S606), and the process is terminated.

As a result of the determination of the step S607, when the correction by the correction code is not possible, the correction failure information and the data receiving information afterwards are transferred from the error correction circuit 112 to the retransmission request generation circuit 113 and the retransmission request command is generated at the retransmission request generation circuit 113 (step S609). The retransmission request generation circuit 113 transmits the generated retransmission request command to the data transmission circuit 104 and the retransmission request command is transmitted (step S610).

As a result of the determination of the step S602, when the received data is not the memory data, it is determined whether the received data is the retransmission request command or not (step S611), and when it is the retransmission request command, the retransmission process is executed (step S612). As a result of the determination of the step S611, when it is not the retransmission request command, the process is terminated.

Next, it will be explained about a retransmission process of data referring to FIG. 7. In the flow chart shown in FIG. 6, when the data which the data receiving circuit 110 received is the retransmission request command, the retransmission process is executed at the step S612. FIG. 7 is a flow chart showing an example of detailed process of the retransmission process of the step S612.

First, the data receiving circuit 110 inputs the received retransmission request command to the retransmission address generation circuit 115 (step S701). The retransmission address generation circuit 115 refers to the received address buffer 114 based on the information regarding how many times before the retransmission object data was transmitted to the serial bus which is added to the retransmission request command, and obtains the storage address on the memory of the data which is the retransmission object (step S702). Next, the data retransmission circuit 116 has the storage address of the retransmission object data input from the retransmission address generation circuit 115, and compares that address with the history of the received address buffer 114 and confirms whether the data of the same address as the address of the retransmission object data is received after receiving the retransmission request command or not (step S703). As a result of the confirmation when the data of the same address is not received, it reads out the data of said address from the memory 107 via the memory I/F 109 (step S704), transmits it as retransmission data to the code generation circuit 111, and the data is transmitted (step S705). The transmission of the data is performed by adding the correction code in the same way as the transmission of the normal memory data and is performed after waiting for the validation of the transmission right. As a result of the confirmation of the step S703 when it is detected that the data of the same address as the retransmission object data is received, the data is not retransmitted.

Next, the retransmission request command and address are transferred to the retransmission request cancel circuit 117 from the retransmission address generation circuit 115 and a cancel process is performed. The retransmission request cancel circuit 117 receives the received retransmission request command and the storage address of the retransmission object data from the retransmission address generation circuit 115, refers to the retransmission request generation circuit 113, and confirms whether the retransmission request command which has the same data as an object is in the transmission hold state or not (step S706). As a result of the confirmation when the retransmission request command of the same data is in transmission hold, it instructs the cancel of the retransmission request command to the retransmission request generation circuit 113 and the retransmission request is cancelled (step S707). Next, it instructs to cancel the retransmission process corresponding to the received retransmission request command to the retransmission circuit 116 (step S708).

In this way, in the error detection/correction function of this embodiment, the error correction code is added when the data is transmitted and the processing device which received the data performs the error check using the error correction code respectively. When it is the error which is correctable by the error correction code, the error is corrected on each receiving side and only when the correction could not be done the retransmission request command is generated, and at the time point when the serial bus transmission right becomes valid, the retransmission request command is transmitted. The retransmission of the data is not necessary performed by the processing device which transmitted that data. Except for the processing device which failed to receive, as all the processing devices have the right data, the processing device which has its transmission right valid first after receiving the retransmission request command can perform the retransmission of the data. Thereby the retransmission of the data can be performed promptly.

Also, to the retransmission request command, information regarding that the data which is to be the retransmission object was transmitted to the serial bus how many times before the time point when the retransmission request command is transmitted is added. This is not to use the data at the time of transmission to specify the data with which the communication error has occurred. The processing device which received the retransmission request command determines the data to retransmit comparing it with the receiving history data which it has inside and retransmits the data. However, when other processing device transmitted the retransmission data before the transmission right comes around and when its own processing device also failed to receive that object data, the process for the retransmission request command is not performed. Also, when the retransmission request command for the data which its own processing device failed to receive has already been transmitted from the other processing device, the retransmission request command is not transmitted. In this way, by that all the processing devices connected to the serial bus perform the error detection/correction in cooperation, the data retransmission for one data is performed only once. Further, even when the plurality of processing devices failed to receive the same data, the retransmission process is not to be performed in duplication and it can be handled with one retransmission.

The embodiment which has been mentioned above is applied to the system in which a plurality of processors which are arranged in distribution and connected by a serial bus operate in parallel sharing the information with each other. It is adequate for the distributed control system in which the processors arranged in distribution refer to the information of each other and perform the control of each kind of devices using that information because of the features such as the low latency, the fast effective communication speed, the low processor load, that the physically distributed arrangement is easy by the serial bus connection, etc.

As an example of application of such a distributed control system it can be sited a control system of robot. For example, when considering about a humanoid robot of bipedal type which is provided with legs which can stand straight and manipulators which can hold an object, in order to prevent the wiring concentration to the peripheral part of the processor and to make the robot smaller, there is a case where a leg control processor which controls the movement of the legs and a manipulator control processor which controls the movement of the manipulators are provided independently.

As a reason to split the processors, other than the reason to prevent the enlargement of the apparatus by the wiring concentration, there is also a problem that the signal processing performance of the processor is deteriorated by the increase of the I/O devices which one processor controls. Generally, as the external access speed of the processor is limited by the electrical signal characteristics, it tends to be slower than the internal processing speed. The internal processing speed of the processor is enhanced by selecting the processor which has the high operating clock frequency, but the external access speed often does not change much. As during the period while the processor is performing the external access the internal processing is also stopped, when the number of the I/O devices which one processor manages is increased too much, the access to the I/O device (=external access) occupies the majority of the processor processing and there is a case where there is not redundancy to perform the signal processing necessary to the control.

For example, when there is a processor which is dedicated only to the internal signal processing totally without performing the external access, in order to make the signal processing performance twice, there are methods of (1) a method to make the operating clock frequency twice, and (2) a method to increase the processors to two without changing the operating clock frequency. As the power consumption of the processor is almost in proportion to the operating clock frequency, the total power consumption becomes twice with either of the methods. On the other hand, when there is a processor which consumes 50% of the processing time for the external access to the I/O device, (1) with the method to make the operating clock frequency twice, the signal processing performance also becomes twice in the same way, but (2) with the method to increase the processors to two and equally split the I/O devices to manage, by that the external access time which each processor consumes is reduced to the half, the signal processing performance per processor becomes 1.5 times greater and the total signal processing performance of two processors combined becomes three times greater.

In this way, in order to enhance the signal processing performance per power consumption, rather than making the operating clock frequency high in one processor, it is more efficient to distribute the I/O devices increasing the number of the processors with the operating clock frequency kept low. In the case of moving robot which is driven by a battery, as the increase of the power consumption makes the continuous operating time shorter, the reduction of the power consumption is one of the important subjects. Also, even with the robot of external electric supply type, as the increase of the power consumption within the sealed enclosure becomes the cause to raise the internal temperature of the enclosure and to make the operation of the robot instable, the reduction of the power consumption is important.

When performing the distributed control increasing the number of the processors, it is also important to restrain the load by the communication process between the processors to low. From the point of view of the processor, the communication with the other processor is also a kind of external access process, and when the processor itself performs the communication process, it consumes some percentages of the processing time for the communication and there is often the case where even if the number of the processors is increased the total signal processing performance is not enhanced. When the method of the present invention is applied, the communication to share the information between the processors is all automated and as the load of the processor is not necessary, the advantage of the distribution is not deteriorated.

In the configuration in which the distributed control is performed using the independent processors for the manipulator control and the leg control respectively, each processor can be arranged near the control object such that the manipulator control processor is arranged near the manipulator and the leg control processor is arranged near the leg. Thereby the wire between the I/O device such as a sensor, an actuator, etc. and the processor which controls the I/O device can be shorter, and the instability cause such as the noise which is mixed into the analog signal, etc. can be excluded. Also, when it is difficult to pass through multiple wires because there is a movable joint on the path to wire from the processor to the I/O device, etc., by having a configuration in which a local control processor which manages the I/O device which exists ahead of the movable joint is provided ahead of the movable joint separately and the information necessary to the control is communicated to the local control processor via the serial bus according to the method of present invention, the wires to be passed through the movable joint part are only limited to the serial bus and the power line and it is possible to reduce the wiring amount of the movable joint part and to reduce the disconnection establishment and to enhance the reliability.

In order that the above-mentioned humanoid robot holds an object, it is necessary to move the tip part of the manipulator to the position of the object. The manipulator can move the tip part by moving each joint of the manipulator, but in order to move the tip part to the designated position of the space, it is necessary to assume the position and the posture of the body of the humanoid robot by referring to the posture information of the legs. As the posture of the legs at all times changes to absorb the external disturbance element such as the vibration of the ground, etc. and to keep balance of the body of the robot, it is necessary to always obtain the latest information of the posture of the legs and to reflect it to the movement of the manipulator in real time.

On the other hand, in order that the humanoid robot stands erect without falling down, it is necessary to keep balance of the center of balance by controlling the posture of the legs. The legs change their posture by moving each joint of the legs and can change the center of balance of the humanoid robot, but the center of balance of the humanoid robot is also changed by moving the posture of the manipulator, it is necessary to always obtain the latest information of the posture of the manipulator and to reflect it to the movement of the legs in real time.

In this way, in order to cooperative control by that the processor for manipulator control and the processor for leg control refer to each other's information with each other, it is necessary to obtain the information which the other processor has with the low latency in the degree to realize a control loop in a sufficiently short cycle. The amount of the information which is transmitted and received between the processors like this tends to increase as the control becomes complicated. For this reason, the method of the present invention which is not affected by the increase of the shared memory capacity and with which it is possible to communicate with low latency and fast effective communication speed works effectively.

As another application example of such a distributed control system each kind of control system in the automobile can be sited. Multiple processors are mounted being distributed all over the body of the car and multiple devices are distributed controlled in cooperation with each other like engine control and fuel control.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A data communications system in which a plurality of processing devices comprising a serial bus interface, a storage unit to store data, and a processing unit to output an access request to said storage unit are connected to each other via a serial bus, wherein:

a communication control line which connects in daisy chain between said processing devices and performs the transfer of transmission right which permits data transmission to the serial bus is provided, and at least one processing device of said processing devices includes a transmission right management unit which performs the transfer of the transmission right between other processing devices connected via said communication control line and manages a state of the transmission right within said processing device, an interface unit which when a write access request is made from said processing unit to said storage unit, writes data to said storage unit and generates a data transmission request to which an address of write destination and data are added, and when a read access request is made from said processing unit to said storage unit, reads out corresponding data from said storage unit and passes the same to said processing unit, a data transmission unit which receives said data transmission request and when the transmission right of said processing device is valid starts data transmission to the serial bus, and when the transmission right is invalid holds data transmission until the transmission right becomes valid, a data receiving unit which receives data transmitted from other processing devices connected to the serial bus and stores the same in said storage unit, and a state initialization unit which sets an initial state of said processing device so that only the transmission right of one processing device is valid among the plurality of processing devices connected to the serial bus at the initialization.

2. A data communications system of claim 1, wherein:

said transmission right management unit performs a process which receives a transmission right transfer signal from an adjacent processing device via said communication control line and validates the transmission right of said processing device, a process which determines the state of said data transmission unit and when there is no hold transmission data transmits the transmission right transfer signal to a processing device which is adjacent to the opposite side of the processing device from which the transmission right transfer signal is received, and when there is hold transmission data starts data transmission of said data transmission unit and transmits the transmission right transfer signal to the adjacent processing device which is adjacent to the opposite side after the transmission of the data is completed, and a process which invalidates the transmission right of said processing device at the same time as the transmission of the transmission right transfer signal.

3. A data communications system of claim 1, wherein:

said communication control line is connected not in a ring form but in a way that at the processing device of an end part of one communication control line is in an open state, said state initialization unit is configured including an open detection unit which detects that said communication control line is in the open state, and a transmission right initialization unit which: sets the initial state so that when among two communication control lines a first communication control line is in the open state, validates the transmission right of said processing device at the initialization, and when the first communication control line is not in the open state, invalidates the transmission right of said processing device at the initialization, said transmission right management unit, in a process to transmit the transmission right transfer signal to the adjacent processing device, when one communication control line is in the open state, after receiving the transmission right transfer signal from the other communication control line, performs a process which transmits the transmission right transfer signal to the communication control line on a side from which the transmission right transfer signal is received by return.

4. A data communications system of claim 1, further comprises:
a received address buffer which holds address information of received data which is received from said data receiving unit for a plurality of times,
a code generation unit which generates a correction code based on address and data which said transmission unit transmits and adds the same to the transmission data,
an error correction unit which determines the existence of communication error based on the address and data and correction code which said data receiving unit received, performs error correction when the communication error has occurred and error correction using the correction code is correctable, and generates an error signal when the communication error has occurred and error correction is uncorrectable,
a retransmission request generation unit which on receiving the error signal which said error correction unit generated, generates a retransmission request command which includes information about in which received data of how many times before the error occurred and transmits the same to said data transmission unit,
a retransmission address generation unit which, when said data receiving unit received the retransmission request command, determines the data which needs to be retransmitted is the received data of how many times before and obtains storage address of the data which needs to be retransmitted referring to said received address buffer,
a retransmission request cancel unit which on receiving the address obtained by said retransmission address generation unit, refers to said data transmission unit and when the retransmission request command of the same address as the obtained address is in transmission hold, outputs a transmission cancel request of the retransmission request command which is held in said data transmission unit, and
a data retransmission unit which refers to the storage address of the data which needs to be retransmitted which said retransmission address generation unit obtained and history of said received address buffer, and when data of the same address as the address of retransmission object has not been received after receiving the retransmission request command, reads out data of said address from said storage unit and generates that address and data as retransmission data for the retransmission request, and transmits the same to said data transmission unit.

5. A data communications method in a data communications system in which a plurality of processing devices comprising a serial bus interface, a storage unit to store data, and a processing unit to output an access request to said storage unit are connected via a serial bus, wherein:
a communication control line which connects between said processing devices in order and performs the transfer of transmission right which permits data transmission to the serial bus is provided, and performs:
a transmission right management process which performs the transfer of the transmission right between a processing device and other processing devices connected via said communication control line and manages a state of the transmission right within said processing device;
a process which when a write access request is made from said processing unit to said storage unit, writes data to said storage unit and at the same time generates a data transmission request to which an address of write destination and data are added;
a data transmission process which when the transmission right of said processing device is valid, starts data transmission to the serial bus, and when the transmission right is invalid, holds data transmission;
a data receiving process which receives data transmitted from other processing devices connected to the serial bus and stores the same in said storage unit; and
a state initialization process which sets an initial state of said processing device so that only the transmission right of one processing device is valid among the plurality of processing devices connected to the serial bus at the initialization.

6. A data communications method of claim 5, wherein:
said transmission right management process performs a process which receives a transmission right transfer signal from an adjacent processing device via said communication control line, and validates the transmission right of said processing device,
a process when there is no hold transmission data in said data transmission process, transmits a transmission right transfer signal to an adjacent processing device which is adjacent to an opposite side of the processing device from which the transmission right transfer signal is received, and when there is hold transmission data starts data transmission and transmits the transmission right transfer signal to the adjacent processing device adjacent to the opposite side after the transmission of data is completed, and
a process which invalidates the transmission right of said processing device at the same time as the transmission of the transmission right transfer signal.

7. A data communications method of claim 5, wherein:
a received address buffer which holds address information of received data which is received from said data receiving process for a plurality of times is provided, and performs:
a code generation process which generates a correction code based on address and data to be transmitted, and adds the same to transmission data at data transmission,
an error correction process which determines the existence of a communication error based on the received address and data and correction code, performs error correction when a communication error has occurred and error correction using the correction code is correctable, and generates an error signal when the communication error has occurred and the error correction is uncorrectable,
a retransmission request generation process which on receiving the error signal which said error correction process generated, generates a retransmission request command which includes information about in which received data of how many times before the error occurred and makes a data transmission request,
a retransmission address generation process which, when the retransmission request command is received at data reception, determines the data which needs to be retransmitted is the received data of how many times before, and obtains storage address of the data which needs to be retransmitted referring to said received address buffer,
a retransmission request cancel process which on receiving the address obtained by said retransmission address generation process when the retransmission request command of the same address as the obtained address is in transmission hold, performs transmission cancel of the retransmission request command which is held, and a data retransmission process which refers to history of said received address buffer based on the storage address of the data which needs to be retransmitted obtained at said retransmission address generation process, and when data of the same address as the address of the retransmission object has not been received after receiving the retransmission request command, reads out data of said address from said storage unit and generates that address and data as retransmission data for the retransmission request, and makes the data transmission request.

* * * * *